(12) United States Patent
Kleczewski

(10) Patent No.: US 10,801,902 B2
(45) Date of Patent: Oct. 13, 2020

(54) CAPACITIVELY COUPLED SENSOR SYSTEM FOR CONVEYOR BELTS

(71) Applicant: Laitram, L.L.C., Harahan, LA (US)

(72) Inventor: Lazlo Kleczewski, Oostzaan (NL)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/609,364

(22) PCT Filed: Mar. 28, 2018

(86) PCT No.: PCT/US2018/024735
§ 371 (c)(1),
(2) Date: Oct. 29, 2019

(87) PCT Pub. No.: WO2018/203994
PCT Pub. Date: Nov. 8, 2018

(65) Prior Publication Data
US 2020/0182712 A1 Jun. 11, 2020

Related U.S. Application Data

(60) Provisional application No. 62/500,244, filed on May 2, 2017.

(51) Int. Cl.
*G01G 7/00* (2006.01)
*B65G 43/08* (2006.01)
*G01L 1/14* (2006.01)

(52) U.S. Cl.
CPC .............. *G01L 1/146* (2013.01); *B65G 43/08* (2013.01); *G01G 7/00* (2013.01)

(58) Field of Classification Search
CPC .. G01L 1/146; G01L 1/14; G01G 7/00; B65G 43/08
USPC ...... 198/340, 502.1, 810.01, 810.02, 810.03, 198/810.04
See application file for complete search history.

(56) References Cited

U.S. PATENT DOCUMENTS

| 4,730,496 A | 3/1988 | Knecht et al. | |
| 4,825,967 A * | 5/1989 | Sakamoto | G01G 7/06 177/210 C |
| 4,856,603 A * | 8/1989 | Murakoso | G01G 7/06 177/210 C |
| 4,986,410 A * | 1/1991 | Shields | B65G 43/08 198/444 |

(Continued)

*Primary Examiner* — Douglas A Hess
(74) *Attorney, Agent, or Firm* — James T. Cronvich

(57) ABSTRACT

A sensor system for a conveyor belt comprising a sensor stage on the conveyor belt and a stationary drive and detection stage external to the conveyor belt in the belt carryway. In an exemplary version, the sensor stage includes a capacitor sensor whose capacitance varies with the weight of a load atop a pressure platform at the belt's conveying surface. An oscillator in the drive and detection stage drives the capacitor sensor through capacitors formed when plates in the sensor stage in the advancing conveyor belt overlap stationary plates in the drive and detection stage during the belt's passage along the carryway. The corresponding plates in the belt and the carryway have different longitudinal dimensions to ensure constant plate overlap area of longer duration and despite lateral belt-tracking offset. The drive and detection stage detects the capacitance of the sensor and converts it into a weight value.

33 Claims, 9 Drawing Sheets

(56) References Cited

U.S. PATENT DOCUMENTS

| | | | | |
|---|---|---|---|---|
| 7,494,004 B2* | 2/2009 | Stolyar | ............... | B65G 43/02 198/810.02 |
| 7,779,994 B1* | 8/2010 | Travis | ............... | B65G 43/02 198/810.02 |
| 8,168,897 B2* | 5/2012 | Sudkamp | ............... | A01K 43/00 177/16 |
| 9,004,271 B2* | 4/2015 | Fourney | ............... | B65G 43/00 198/851 |
| 9,146,146 B2* | 9/2015 | Laird | ............... | G01G 19/00 |
| 9,321,598 B2 | 4/2016 | Araki et al. | | |
| 9,571,012 B2* | 2/2017 | DePaso | ............... | B29C 45/0005 |
| 9,746,385 B2* | 8/2017 | Kar | ............... | G01L 1/16 |
| 9,778,098 B2* | 10/2017 | Miyata | ............... | G01L 5/106 |
| 10,094,699 B2* | 10/2018 | Kleczewski | ............... | G01G 3/16 |
| 10,094,702 B2* | 10/2018 | Laird | ............... | G01G 19/035 |
| 10,191,001 B2* | 1/2019 | Kleczewski | ............... | G01N 27/228 |
| 10,351,033 B2 | 7/2019 | Kawahira et al. | | |
| 10,494,191 B2* | 12/2019 | Happe | ............... | B65G 43/06 |
| 10,597,236 B2* | 3/2020 | Kleczewski | ............... | B65G 43/02 |
| 10,654,656 B2* | 5/2020 | Mader | ............... | G01L 5/107 |
| 2007/0261894 A1 | 11/2007 | Harish | | |
| 2013/0221761 A1 | 8/2013 | Depaso | | |
| 2015/0292935 A1 | 10/2015 | Kleczewski | | |
| 2016/0103084 A1 | 4/2016 | Kleczewski | | |
| 2016/0252387 A1 | 9/2016 | Laird et al. | | |

* cited by examiner

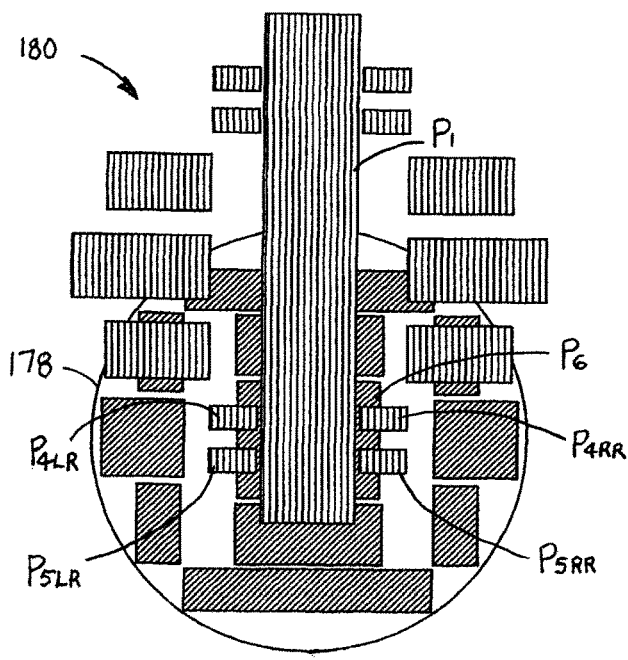
FIG. 13
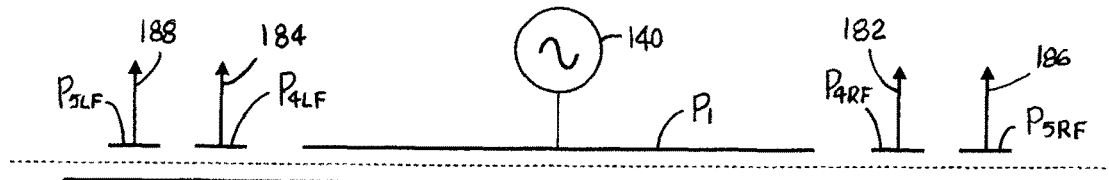
FIG. 14
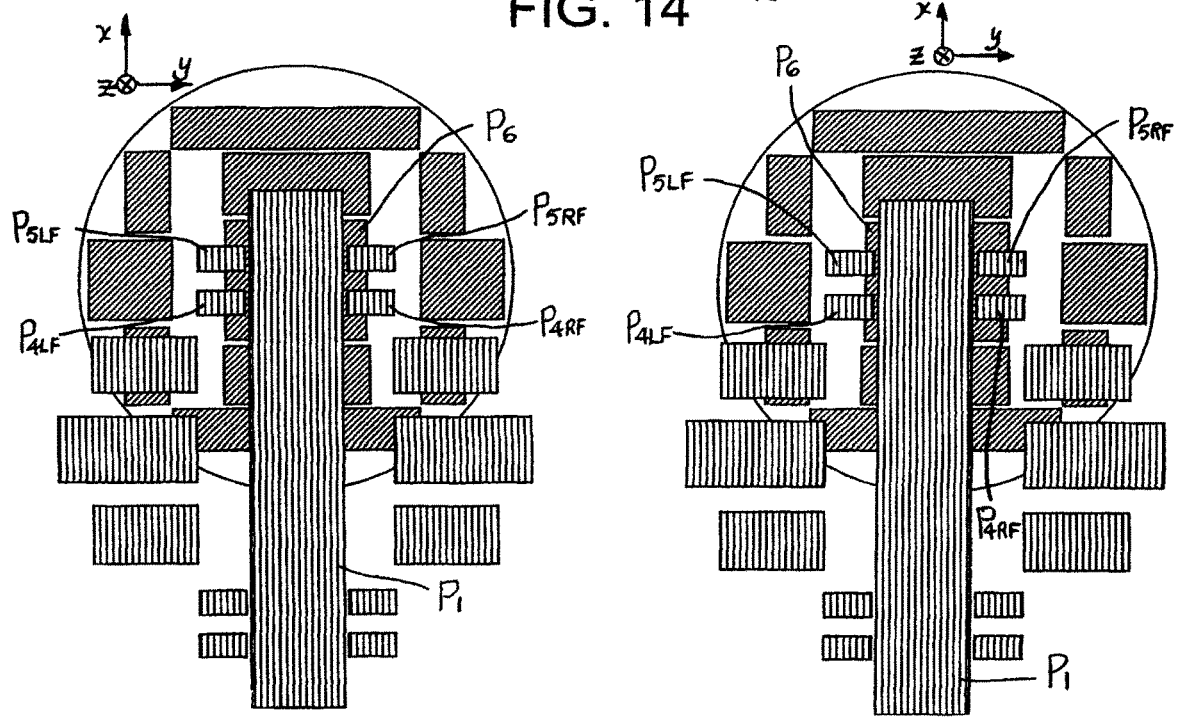
FIG. 15
FIG. 16

CAPACITIVELY COUPLED SENSOR SYSTEM FOR CONVEYOR BELTS

BACKGROUND

The invention relates generally to power-driven conveyors and more particularly to conveyor systems using sensing elements embedded in a conveyor belt to measure various physical properties, such as the weights of conveyed articles, temperature, pressure, and humidity.

Sensors embedded in conveyor belts require power to make sensor measurements and to transmit measurements off the belt. On-belt batteries, storage capacitors, and energy-harvesting devices have been used or proposed for that purpose. But most of those solutions are sensitive to misalignment, require recharging or replacement, take up space, add weight, or weaken the belt.

SUMMARY

One version of a conveyor-belt measuring system embodying features of the invention comprises a conveyor belt having a top side and a bottom side and a drive and detection stage external to the conveyor belt. The drive and detection stage includes an oscillator producing a drive signal, a first external capacitor plate positioned near the bottom side of the conveyor belt and connected in series with the oscillator, a second external capacitor plate positioned near the bottom side of the conveyor belt, and a detector connected to the second external capacitor plate. First and second belt capacitor plates are mounted in the conveyor belt near its bottom side. The first belt capacitor plate and the first external capacitor plate are aligned to form a drive capacitor when the second belt capacitor plate and the second external capacitor plate are aligned to form a communication capacitor. A sensor is mounted in the conveyor belt and connected in series between the drive capacitor and the communication capacitor. The drive capacitor couples the drive signal to the sensor to produce a sensor signal indicative of a physical property measured by the sensor. The detector receives the sensor signal from the communication capacitor.

Another version of a conveyor-measuring system comprises a conveyor belt supported in a carryway and a drive and detection stage external to the conveyor belt. The belt has a sensor stage that includes first and second belt plates disposed near a bottom side of the conveyor belt and a first sensor connected in series with the first and second belt plates and providing a first sensor signal responsive to a physical property. The drive and detection stage includes an oscillator, a first external plate along the carryway connected in series with the oscillator, a first detector, and a second external plate along the carryway connected in series with the first detector. The first external plate overlaps the first belt plate to form a first capacitor when the second external plate overlaps the second belt plate to form a second capacitor and a measurement circuit including the oscillator, the first capacitor, the first sensor, the second capacitor, and the first detector. The first external plate and the first belt plate have different lateral and longitudinal dimensions and the second external plate and the second belt plate have different lateral and longitudinal dimensions.

Yet another version of a conveyor-belt measuring system comprises a sensor stage in a conveyor belt supported in a carryway and a drive and detection stage external to the conveyor belt. The sensor stage includes a first sensor providing a first sensor signal responsive to a physical property and to ambient conditions and a second sensor providing a second signal responsive to the ambient conditions affecting the first sensor and unresponsive to the physical property measured by the first sensor. The drive and detection stage includes an oscillator, a first detector, and a second detector. The oscillator drives the first and second sensors through first and second drive capacitors, each of which has an external plate connected to the oscillator in the drive and detection stage and a belt plate in the conveyor belt connected to the first sensor or the second sensor. The first and second sensor signals are sent to the first and second detectors through first and second communication capacitors, each of which has an external plate connected to the first detector or the second detector in the drive and detection stage and a belt plate in the conveyor belt connected to the first sensor or the second sensor. The second signal is combinable with the first signal to compensate for the effect of ambient conditions on the first signal.

In another aspect a conveyor-belt weighing system includes a conveyor belt having a top side and a bottom side. A sensing capacitor mounted in the conveyor belt has a capacitance that varies with the weight of an article on the top side of the conveyor belt above the sensing capacitor. A drive capacitor and a communication capacitor are connected in series with the sensing capacitor. The drive capacitor and the communication capacitor each have a first plate in the conveyor belt near the bottom side and a second plate external to the conveyor belt near the bottom side so that the first and second plates of the drive capacitor overlap when the first and second plates of the communication capacitor overlap. An oscillator external to the conveyor belt energizes the sensing capacitor through the drive capacitor to produce a weight signal that varies with the capacitance of the sensing capacitor. A weight detector external to the conveyor belt and connected to the communication capacitor receives the weight signal.

BRIEF DESCRIPTION OF THE DRAWINGS

FIG. 13 is a plan view as in FIG. 9, with the rear plates of the drive and detection stage arranged to measure tracking offset;

FIG. 14 is an electrical schematic of the arrangement of capacitor plates for making the measurements from the arrangement of FIG. 15;

FIG. 15 is a plan view as in FIG. 13, but with the front plates making the measurements;

FIG. 16 is a top-plan view as in FIG. 15, but with a tracking offset;

DETAILED DESCRIPTION

Figure 1:
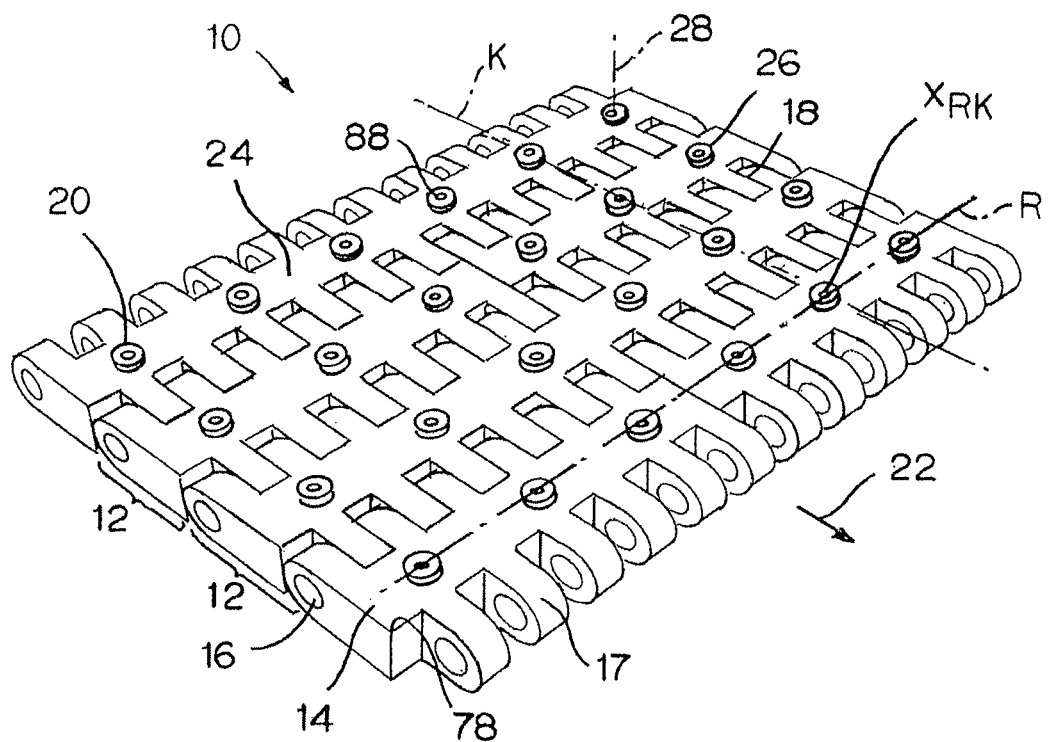
FIG. 1 is a perspective view of a portion of a conveyor belt embodying features of the invention including force sensors.

A portion of one version of a conveyor belt embodying features of the invention is shown in FIG. 1. The conveyor belt 10 is a modular plastic conveyor belt constructed of a series of rows 12 of one or more plastic belt modules 14 hingedly connected end to end by hinge rods 16 or pins in interleaved hinge elements 17 forming hinge joints 18 between consecutive rows. The belt modules 14 are conventionally injection-molded out of a thermoplastic polymer, such as polypropylene, polyethylene, acetal, or a composite polymer. Sensors, such as force sensors 20, or load cells, are embedded in the conveyor belt 10 at individual positions. The sensors may reside in every row 12 of the belt modules 14 or only in selected belt rows. In this version, which is used as an example, the sensors are force sensors 20 arranged in a two-dimensional array of rows R across the width of each belt row 12 and columns K along the length of the belt in a conveying direction 22. In this way the position of any individual force sensor 20 can be defined as $X_{RK}$, where R represents the row (or belt row if each belt row has only one row of force-sensitive element) and K represents the column from one side of the belt to the other. The required density of the array or the separation between rows and columns of force sensors for a given belt may be determined with a priori knowledge of the sizes and shapes of the conveyed articles. In this version each force sensor 20 includes a pressure platform 26 that is biased upward slightly above a top side 24 of the belt 10. The pressure platforms 26 form salient protrusions slightly above the belt's conveying surface 24 so that the entire weight of a conveyed article is borne by one or more platforms. The force sensors 20 have sensing axes 28 that are perpendicular, or normal, to the top conveying side 24 to measure forces, such as the weights of conveyed articles, applied normal to the conveying surface at the positions of the force sensors on the belt.

Figure 2:
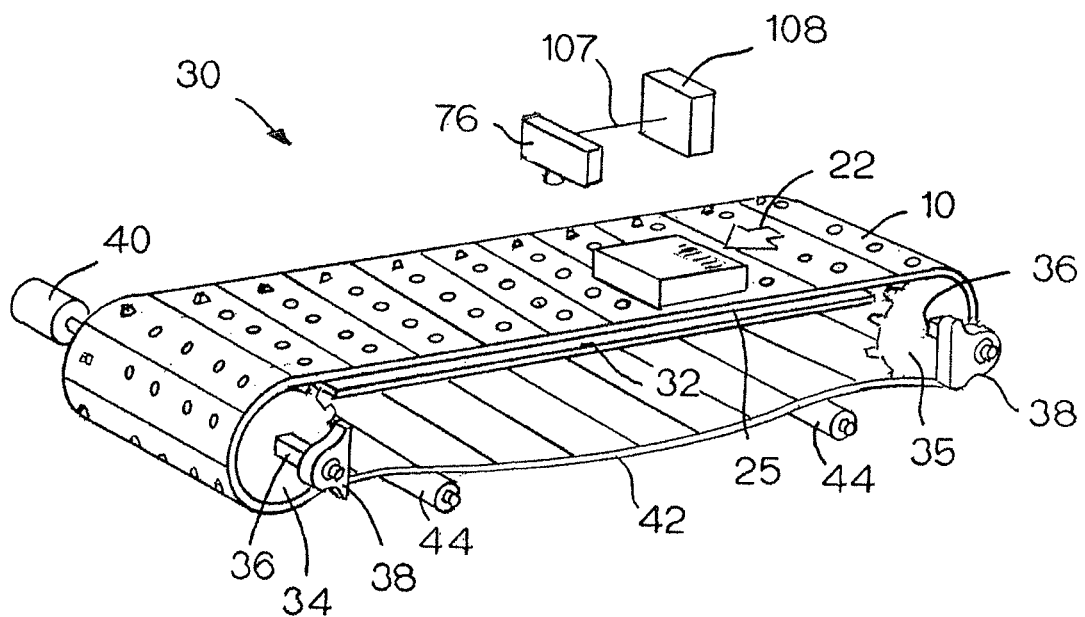
FIG. 2 is an isometric view of a conveyor system using a conveyor belt as in FIG. 1.

The conveyor belt 10 is shown in a weighing system 30 in FIG. 2 as an example. The conveyor belt advances in the conveying direction 22 along an upper carryway 32. The endless belt is trained around drive and idle sprocket sets 34, 35 mounted on shafts 36, whose ends are supported in bearing blocks 38. A drive motor 40 coupled to the drive shaft rotates the drive sprockets 34, which engage the bottom side 25 of the belt and drive the belt in the conveying direction 22 along the upper carryway 32. The belt returns along a lower returnway 42. Rollers 44 support the belt in the returnway and reduce the maximum catenary sag.

Figure 3:
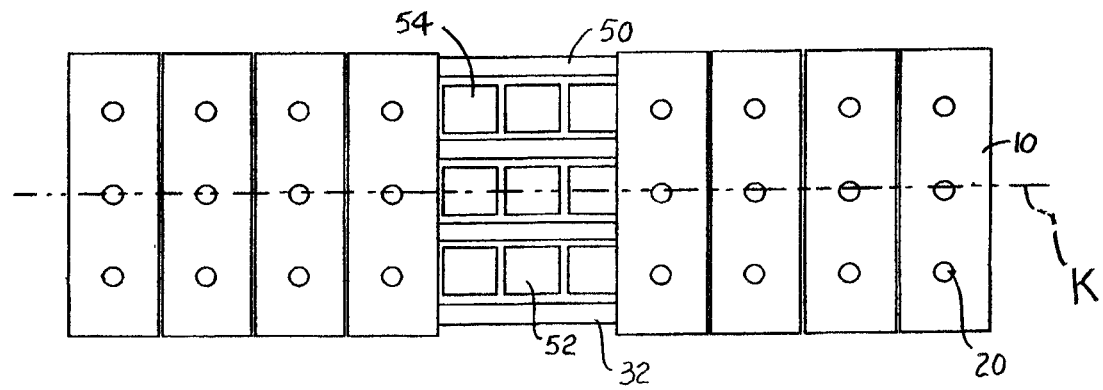
FIG. 3 is a top plan view of a portion of the conveyor system of FIG. 2 partly cut away.

As shown in FIG. 3, the conveyor belt 10 is supported along the carryway 32 atop wearstrips 50. Drive and detection stages 52 for the force sensors 20 are housed in housings 54 whose top surfaces are at or slightly below the level of the tops of the wearstrips 50. The drive and detection systems 52 are arranged in columns aligned with the columns K of the force sensors 20 in the conveyor belt 10.

Figure 4:
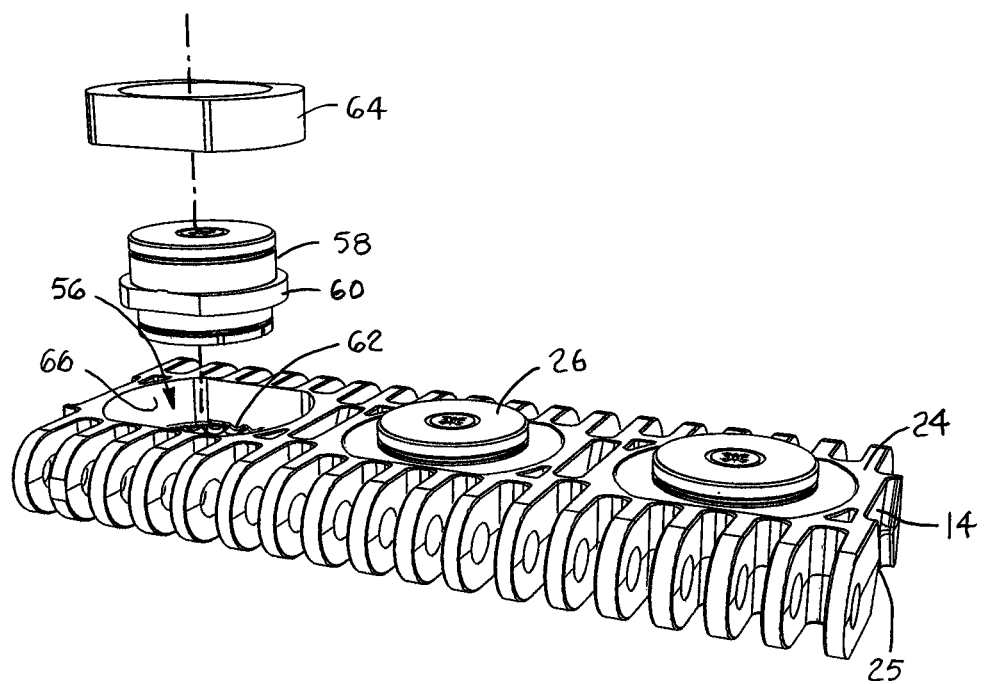
FIG. 4 is an axonometric view, partly exploded, of a single belt module of a conveyor belt as in FIG. 1 with force sensors.

As shown in FIG. 4, each belt module 14 has one or more cavities 56 that open onto the top side 24 and onto the bottom side 25. A force-sensor assembly 58 is mounted in each cavity 56. In this version a shoulder 60 on the assembly 58 sits on a ledge 62 in the cavity 56. A retainer 64 sits on top of the shoulder 60 and retains the assembly 58 in the cavity 56. The retainer 64 is welded, bonded, snap-fit, press-fit, glued, or otherwise fastened to the interior wall 66 of the cavity 56. The pressure platform 26 protrudes above the top side 24 and the flush top face of the retainer 64.

Figure 5A:
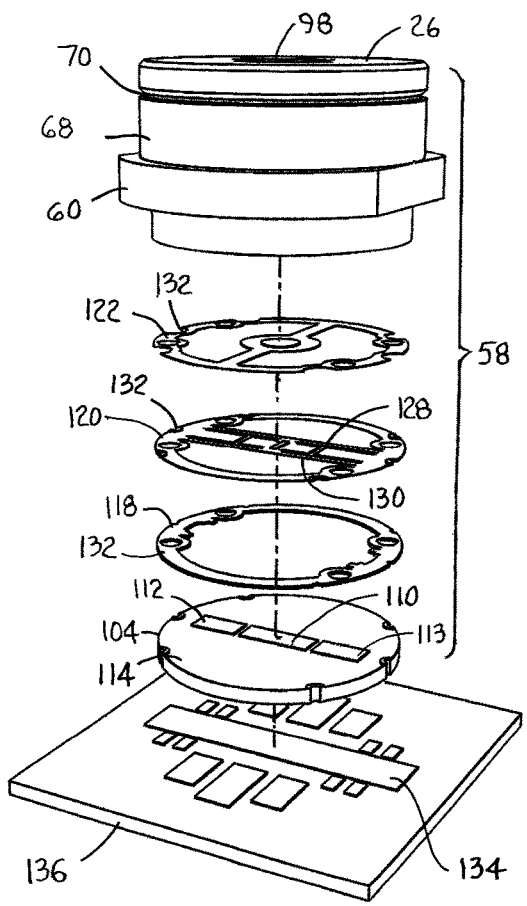
FIGS. 5A and 5B are exploded views of a force sensor as in FIG. 4 from an upper perspective and a lower perspective.
Figure 5B:
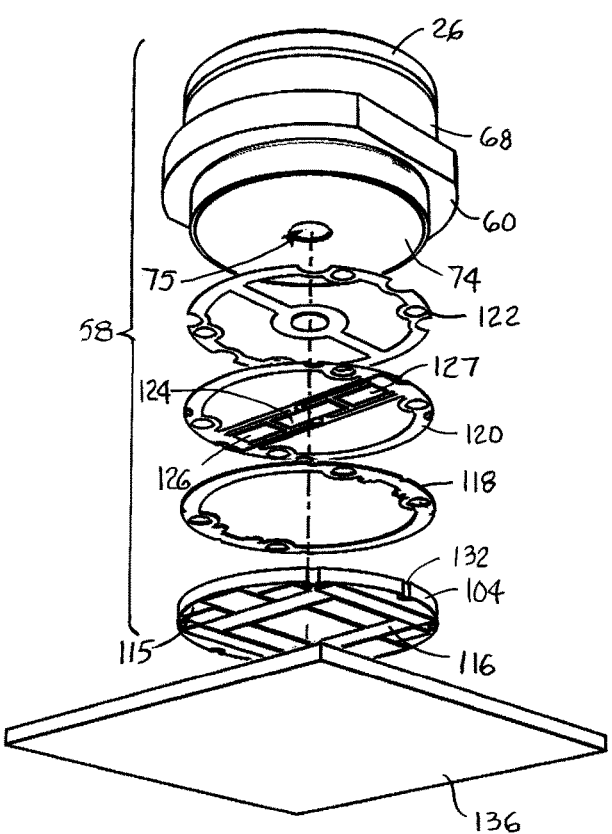
Figure 6:
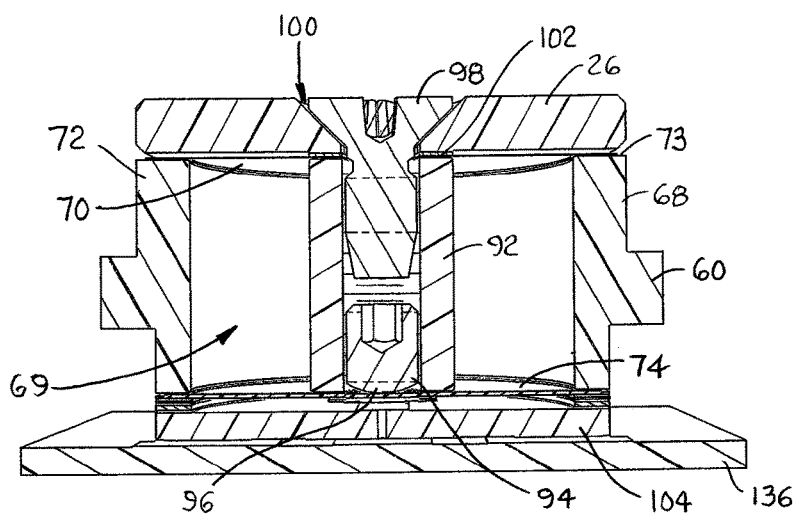
FIG. 6 is a cross section of the force sensor of FIGS. 5A and 5B.

The sensor assembly of this exemplary version is shown in more detail in FIGS. 5A, 5B, and 6. The pressure platform 26 sits atop a hollow frame 68 surrounding a circular cylindrical region 69. An upper spring membrane 70 with a central bore is sandwiched between the outer edge of the pressure platform 26 and the top 73 of the frame's wall 72. Except for the bore, the upper spring membrane 70 covers the cylindrical region 69 at the top of the frame 68 to which it is fastened by gluing or welding, for example. The upper spring membrane 70 deflects as a function of the load resting on the pressure platform 26 and resists horizontal movement. It also biases the pressure platform 26 upward slightly. A lower spring membrane 74 having a central bore 75 similarly covers the cylindrical region 69 at the bottom of the frame 68 to which it is fastened. The lower spring membrane 74 also deflects with load and further resists torque. The two membranes 70, 74 form a dual-membrane spring made of stainless steel, for example. An internally threaded, hollow center pin 92 resides in the cylindrical interior region 69 of the frame 68 in contact with the upper and lower spring membranes 70, 74. An externally threaded set screw 94 with a domed head 96 is screwed into the bottom of the center pin 92. The set screw 94 is adjusted so that its head 96 pushes against the lower spring membrane 74. A flat-head fixation screw 98 extends through a countersunk hole 100 in the pressure platform 26 and the bore of the upper spring membrane 70 and into threaded engagement with the center pin 92. The screw 98 is tightened into the pin 92 to retain the pressure platform 26. A stroke-limiting shim 102 between the bottom of the pressure platform 26 and the top of the center pin 92 limits the downward stroke of the pressure platform 26. By transferring overloads to the frame 68, the stroke limiter 102 ensures that the forces on the dual-membrane spring do not exceed an upper limit that could result in damage to the spring membranes 70, 74. The stroke limiter 102 allows the conveyor belt to be supported by rollers in the return and protects against abuse caused by dropped products or persons walking across the belt.

A bottom capacitor disk 104 has a measurement capacitor bottom plate 110 flanked by a pair of reference capacitor bottom plates 112, 113 on its top face 114. Communication capacitor plates 116, which are formed on a bottom face 115 of the bottom capacitor disk 104, serve as antennas receiving power from and transmitting data to the drive and detection stage. The bottom capacitor disk 104 is thick to mechanically strengthen the sensor assembly. Stacked between the bottom capacitor disk 104 and the lower spring membrane 74 are a capacitor spacer ring 118, a top capacitor ring 120, and an interface ring 122. A measurement capacitor top plate 124 and a pair of reference capacitor top plates 126, 127 are formed on the bottom face of the reference capacitor ring 120. Slits 128 in a cross beam 130 of the top capacitor ring 120 allow the measurement capacitor top plate 124 to deflect under pressure applied to the center of the beam. To compensate for manufacturing tolerances, the set screw 94 is threaded into the center pin 92 at the factory so that the domed head 96 of the set screw deflects the measurement capacitor top plate 122 slightly under no load to a start, or zero, position. The slits 128 also mechanically isolate the top plates 126, 127 of the reference capacitor from the top plate of the measurement capacitor 124. The interface ring 122, which is made of a non-conductive material to electrically insulate the metal lower spring membrane 74 from the capacitor plates 124, 126, 127 on the top capacitor ring 120, forms a mechanical interface between the membrane and the capacitors. The interface ring 122 transfers the displacement of the spring uniformly to the measurement capacitor top plate 124 and, under pressure from the set screw 94, slightly pretensions the top plate to ensure that it is always being pressed on by the membrane spring. The capacitor spacer plate 118 sets the plate separation between the top capacitor plates 124, 126, 127 and the bottom plates 110, 112, 113. Alignment slots 132 in the rings 118, 120, 122 and in the bottom capacitor disk 104 ensure proper alignment of the top and bottom capacitor plates. The stacked disk 104 and rings 118, 120, 122 are fastened to the bottom of the sensor frame 68 by adhesives, welds, or fasteners. The communication capacitor plates 116 on the bottom face 115 of the bottom capacitor disk 104 form communication capacitors with communication capacitor plates 134 on a substrate 136 mounted in a conveyor frame below the sensor assembly 58 and the bottom side of the conveyor belt supported in the frame.

Figure 7:
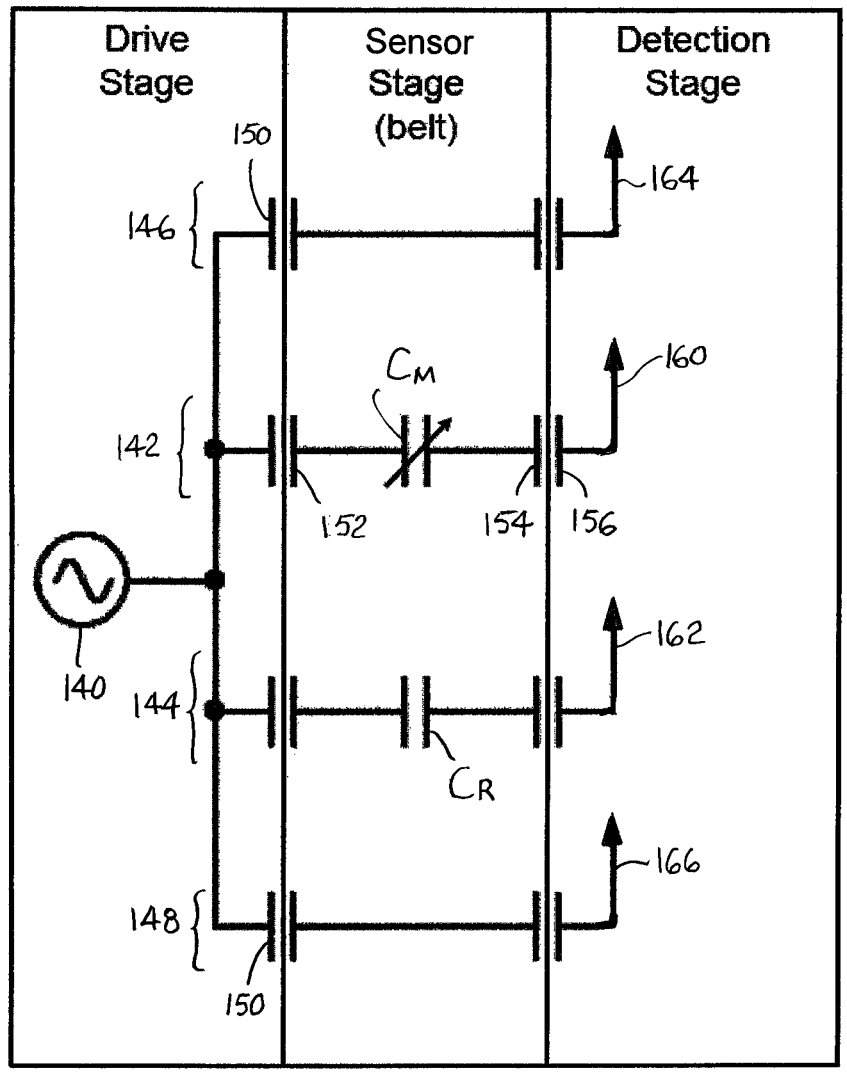
FIG. 7 is a top-level electrical schematic of a sensor stage including a force sensor as in FIG. 4 and a drive and detection stage in a force-sensing system.
Figure 8:
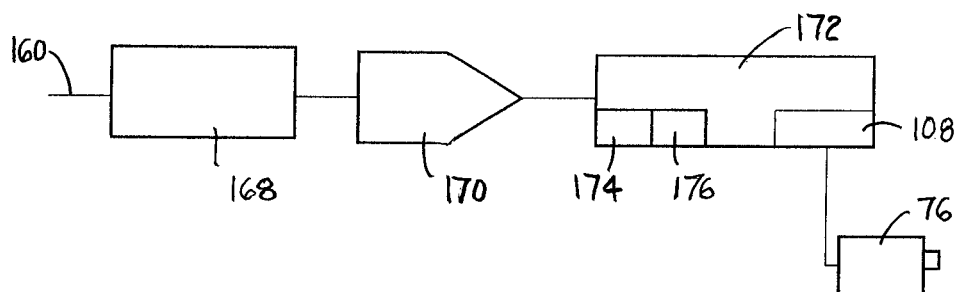
FIG. 8 is a block diagram of the detection section of the drive and detection stage and a processor usable in a force-sensing system as in FIG. 7.

An electrical schematic of a single basic capacitive sensor system is shown in FIG. 7. An oscillator 140 is shown driving four capacitive measurement circuits: (a) a main measurement circuit 142; (b) a reference circuit 144; (c) a front belt-height circuit 146; and (d) a rear belt-height circuit 148. The oscillator 140 is an ac oscillator operating, for example, at 35 MHz. But other frequencies lower or higher than 35 MHz can be used. The oscillator 140, which resides in the conveyor frame external to the conveyor belt, energizes the sensor assembly in the conveyor belt through the drive plates 150 in the frame-supported substrate 136 (FIG. 5A). The oscillator 140 and the drive plates 150 form an external drive section of a drive and detection stage. The external drive plates 150 form capacitors with belt capacitor plates 152 in the belt's sensor assembly when the external drive plates overlap the belt plates. A main measurement capacitor $C_M$ in the conveyor belt has a capacitance that varies with the force applied to its upper plate 124 (FIG. 5B). The measurement capacitor $C_M$, which is connected in series between the input belt capacitor plate 152 and an output belt communication capacitor plate 154 in the sensor assembly, forms a sensor stage of the sensor system. In the sensor stage all the components are passive components that draw no power unless energized from a power source external to the belt. The belt communication capacitor plate 154 is capacitively coupled to an external communication plate 156 on the substrate 136 (FIG. 6) external to the conveyor belt. The components in the belt form a sensor stage. Together the belt communication capacitor plate 154 and the external communication capacitor plate 156 form a communication capacitor connected to an external detection section, which may be co-located with the drive section to form the drive and detection stage external to the conveyor belt. A sensor measurement signal 160, e.g., a force or weight signal in this example, is routed to the external detection section as indicated by the arrow. The external detection section includes a signal conditioner 168, an analog-to-digital converter (ADC) 170, and a processor 172, as shown in FIG. 8. The signal conditioner includes, for example, a rectifier and a filter to convert the ac signal to a dc signal, amplifiers to boost the signal level to comport with the range of the ADC, and buffer amplifiers. A multiplexer (not shown) could be used to multiplex multiple measurement signals from the various circuits to a single ADC. The processor, which may be a programmable computer having, internally or externally, a program memory 174 from which software routines execute, a random-access memory 176 for holding temporary data, and, optionally, a video processor 108 for processing signals from a video camera 76. Each external detection section may have its own local slave processor, or the processor may be a master processor in communication with the detection sections.

A reference capacitor $C_R$ (FIG. 7) is connected into the reference circuit 144 in the same way as the measurement capacitor $C_M$ is connected into the measurement circuit 142. The reference signal 162 is sent to the processor 172 as in FIG. 8 through an identical signal conditioner 168 and ADC 170. The reference capacitor $C_R$ has a fixed nominal plate separation for a fixed nominal capacitance, e.g., equal to the nominal capacitance of the variable measurement capacitor $C_M$.

The reference capacitor $C_R$ is mechanically isolated from the measurement capacitor $C_M$ by the construction of the top capacitor ring 120 as shown in FIGS. 5A and 5B. A load resting on the pressure platform 26 deflects the upper spring membrane 70, the center pin 92, and the set screw 94 downward against the lower spring membrane 74. The domed head 96 of the set screw 94 pushes the center of the interface plate 122 downward deflecting the top measurement capacitor plate 124 downward closer to the fixed bottom capacitor plate 110. The decreased plate separation increases the capacitance of the measurement capacitor $C_M$ and changes the weight signal 160 (FIG. 7) accordingly. The amount of deflection of the top measurement capacitor plate is proportional to the weight of the load resting on the pressure platform 26. The dual membrane spring 70, 74 exhibits a nonlinear spring displacement that compensates for the nonlinearity of the capacitance with displacement. Because the capacitance of the reference capacitor $C_R$, which is located close to the measurement capacitor $C_M$, is fixed and insensitive to the load applied to the measurement capacitor, the reference capacitor is used to compensate for changes in the measurement capacitance due to ambient conditions other than the physical property—force or weight, in this case—measured by the main sensor. Some examples of ambient conditions are vibration, temperature, air pressure, and humidity. The processor 172 (FIG. 8) subtracts the reference signal (scaled as appropriate) from the sensor measurement signal to remove ambient effects. Alternatively, the compensation can be performed in the analog domain in hardware. The compensated analog signal would be converted to digital in an ADC and sent to the processor. Thus, compensation can be implemented by compensation means such as a processor software routine or a hardware circuit.

As shown in FIG. 7, the oscillator 140 also drives two belt-height circuits 146, 148. In effect, each circuit produces a signal (a front belt-height signal 164 and a rear belt-height signal 166) proportional to the circuit's capacitance. The capacitance is inversely proportional to the distance between the plates 150, 156 on the stationary external side and the plates 154 on the belt. Because the distance is a measure of the height of the belt, the processor 172 (FIG. 8) can use the front and rear capacitance measurements to compensate for the effects of changes in belt height above the carryway conveyor frame on the main measurement. All the example circuits shown in FIG. 7 are capacitive voltage dividers that produce output voltage signals that vary with the circuit capacitances.

Figure 9:
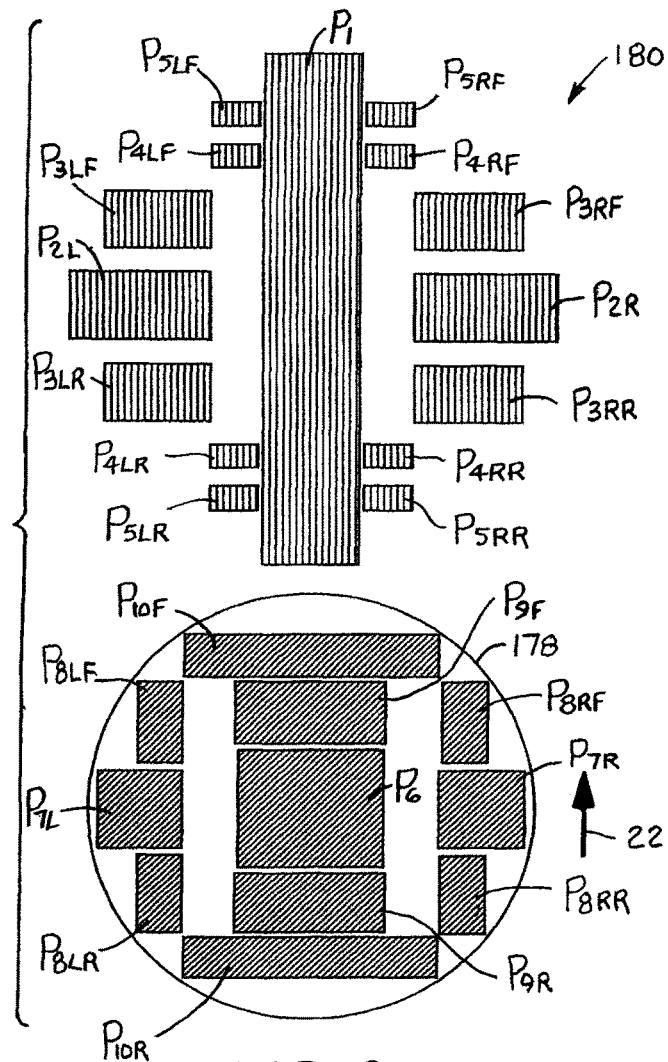
FIG. 9 is a plan view of the capacitor plates of the drive and detection stage on top and of the belt-embedded sensor stage at the bottom when not overlapping.

FIG. 9 shows an exemplary version of a geometrical arrangement of drive and communication capacitor plates in the sensor stage 178 advancing with the conveyor belt in the conveying direction 22 and in the stationary drive and detection stage 180. The capacitor plates and their functions are listed in Table I.

TABLE 1

| Platform | Label | Plate Function |
| --- | --- | --- |
| Drive and Detection Stage | $P_1$ | Main drive (primary) |
| | $P_{2R}$ | Measurement communication (right) |
| | $P_{2L}$ | Measurement communication (left) |
| | $P_{3RF}$ | Reference communication (right front) |
| | $P_{3LF}$ | Reference communication (left front) |
| | $P_{3RR}$ | Reference communication (right rear) |
| | $P_{3LR}$ | Reference communication (left rear) |
| | $P_{4RF}$ | Height (right front) |
| | $P_{4LF}$ | Height (left front) |
| | $P_{4RR}$ | Height (right rear) |
| | $P_{4LR}$ | Height (left rear) |
| | $P_{5RF}$ | Tracking (right front) |
| | $P_{5LF}$ | Tracking (left front) |
| | $P_{5RR}$ | Tracking (right rear) |
| | $P_{5LR}$ | Tracking (left rear) |
| Sensor Stage | $P_6$ | Measurement drive (secondary); Tracking-Height drive (secondary) |
| | $P_{7R}$ | Measurement communication (right) |
| | $P_{7L}$ | Measurement communication (left) |
| | $P_{8RF}$ | Reference communication (right front) |
| | $P_{8LF}$ | Reference communication (left front) |
| | $P_{8RR}$ | Reference communication (right rear) |
| | $P_{8LR}$ | Reference communication (left rear) |
| | $P_{9F}$ | Reference drive (front) (secondary) |
| | $P_{9R}$ | Reference drive (rear) (secondary) |
| | $P_{10F}$ | Height drive (front) |
| | $P_{10R}$ | Height drive (rear) |

Figure 10:
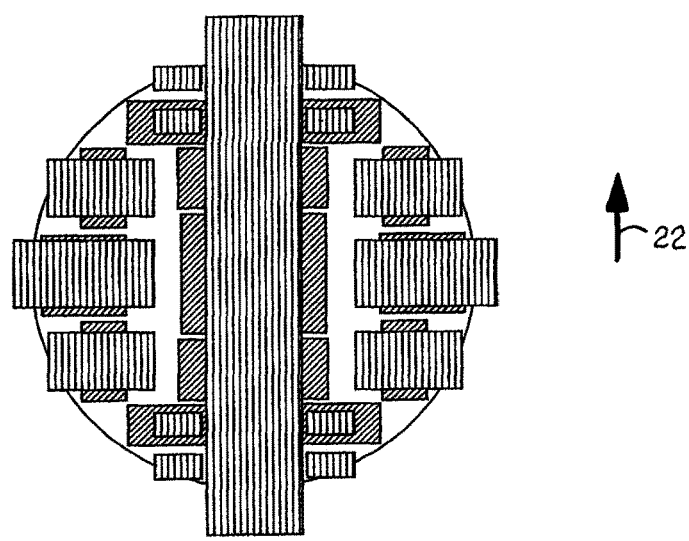
FIG. 10 is a plan view as in FIG. 9, but with the plates overlapping for the main measurement.
Figure 11:
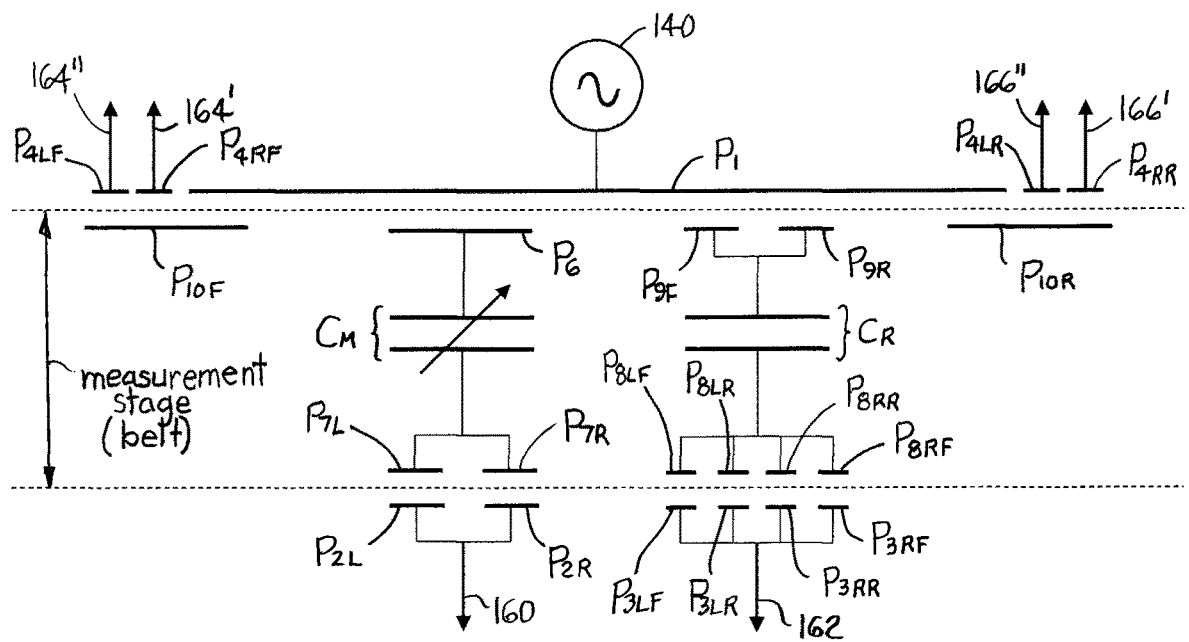
FIG. 11 is an electrical schematic of the capacitor plates when overlapped as in FIG. 10.

When the conveyor belt is tracking properly, i.e., no lateral wander, or offset, as it advances in the conveying direction 22, the capacitor plates align as shown in FIG. 10 with maximum capacitive coupling. FIG. 11 shows the capacitors formed by the overlapping plates of FIG. 10. The longitudinal and lateral dimensions of corresponding capacitor plates, i.e., the lengths and widths in the case of the rectangular plates shown in this example, are different, which helps ensure constant plate overlap area for a longer duration and despite lateral offset of the belt relative to the carryway. The oscillator 140 energizes the measurement capacitor $C_M$ through a main drive capacitor formed by the plates $P_1$ (primary) and $P_6$ (secondary) and main measurement communication capacitors formed by the plates $P_{7L}$ and $P_{2L}$ and the plates $P_{7R}$ and $P_{2R}$. The measurement signal, in this example the weight signal 160, is sent to the signal conditioner and ADC and on to the processor in digital form. In a similar way the reference capacitor $C_R$ is driven by the oscillator 140 through the main drive plate $P_1$ and the two belt drive plates $P_{9R}$ and $P_{9L}$. The drive plates $P_{9R}$, $P_{9L}$ are connected in series with the reference capacitor $C_R$ and reference communication capacitors formed by the parallel combination of the belt plates $P_{8RF}$, $P_{8LF}$, $P_{8RR}$, $P_{8LR}$ and the external capacitor plates $P_{3RF}$, $P_{3LF}$, $P_{3RR}$, $P_{3LR}$. The reference signal 162 is routed to the signal conditioner and on to the processor, which uses the reference signal to compensate for ambient conditions in the sensor measurement signal 160.

If the height of the belt above the carryway can fluctuate enough to affect the measurements, the height of the belt above the carryway can be measured and used to correct the measurement and reference signals. The height of the front of the belt module above the carryway is measured by the capacitance of a circuit formed by the main drive capacitor plate $P_1$, the belt front height capacitor plate $P_{10F}$, and the external right and left front height capacitor plates $P_{4RF}$, $P_{4LF}$. The output signals 164' and 164" are sent to the signal conditioners of height detectors and on to the processor, which uses their outputs to determine the height of the front of the belt module. The height of the rear of the belt module is similarly determined by the capacitance of the rear height circuit formed by the external main drive plate $P_1$, the belt rear height capacitor drive plate $P_{10R}$, and the external right and left rear height capacitor plates $P_{4RR}$, $P_{4LR}$. The height values can then be used to compensate for the change in the capacitances of the measurement and reference capacitor circuits due to the changing plate separation of the drive and communication capacitor plates. The processor can also calculate the forward or rearward pitch angle of the belt as $\theta = \arctan[(h_F - h_R)/d]$, where $h_F$ is the calculated height of the front belt plate $P_{10F}$, $h_R$ is the calculated height of the rear belt plate $P_{10R}$, and d is the distance between the centers of the plates $P_{10F}$ and $P_{10R}$. For the small pitch angles expected, $\theta \approx (h_F - h_R)/d$. (The pitch of a belt module as used in this application refers to the rotation of the module about its lateral centerline—not to the distance between its front and rear articulation axes.) The calculated pitch, which is a measure of the height of the belt module at any point from front to rear, can be used instead of an average height value to correct other measurements based on the longitudinal positions of the belt plates involved in those other measurements.

Figure 12:
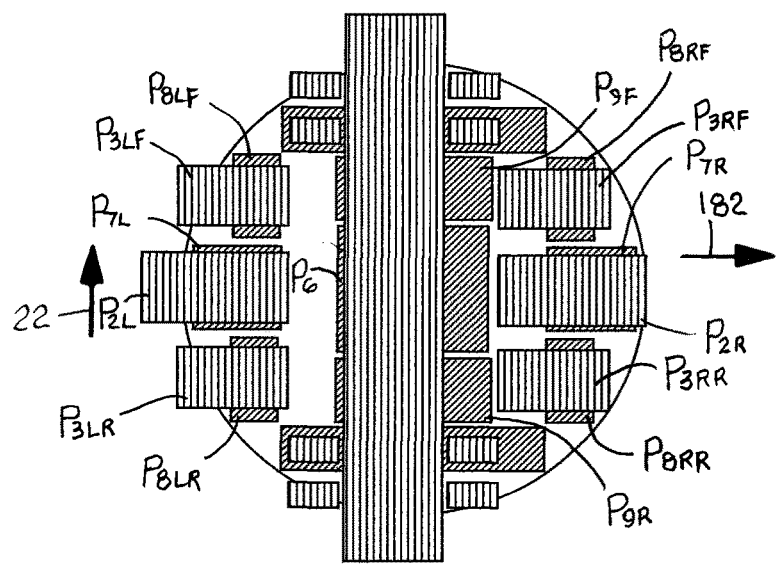
FIG. 12 is a plan view as in FIG. 9, but with the belt shifted laterally relative to the stationary external drive and detection system.

As FIG. 12 shows, a lateral tracking offset in the lateral direction 182 over a reasonable range of lateral offsets in both directions does not result in a change in any of the capacitances because the area of the overlap of the belt plates and the external plates is the same as that for the no-lateral offset condition in FIG. 10. That result is achieved by making one or the other of the corresponding belt and external plates longer than the other in the longitudinal, or conveying, direction 22 and by making the plate that is shorter in the conveying direction longer in the lateral direction 182. (See, for example, external plate $P_{3RR}$ and belt plate $P_{8RR}$.) To simplify the calibration of the sensor measurement signal with the reference signal, the drive and communication capacitances for each can be made identical with the same plate overlap area. For example, the area of the belt measurement drive plate $P_6$ is the same as the sum of the areas of the belt reference drive plates $P_{9F}$, $P_{9R}$. The areas of the belt measurement communication plates $P_{7R}$ and $P_{7L}$ are the same as the area of the front and rear belt reference communication plates $P_{8RF}$, $P_{8LF}$ and $P_{8RR}$, $P_{8LR}$, and the areas of the external measurement communication plates $P_{2R}$, $P_{2L}$ are the same as the areas of the external front and rear reference communication plates $P_{3RF}$, $P_{3LF}$ and $P_{3RR}$, $P_{3LR}$.

Tracking, or lateral belt wander relative to the carryway, and roll and yaw of each belt module is measured when the capacitor plates of the advancing belt sensor 178 are aligned with the capacitor plates of the stationary drive and detection stage 180 as in FIG. 13 or FIG. 15. In FIG. 13 the stationary rear right and left height and tracking plates $P_{4RR}$, $P_{4LR}$ and $P_{5RR}$, $P_{5LR}$ overlap the belt capacitor plate $P_6$. In FIG. 15 the stationary front right and left height and tracking plates $P_{4RF}$, $P_{4LF}$ and $P_{5RF}$, $P_{5LF}$ overlap the belt capacitor plate $P_6$. These two conditions occur before and after the main measurement with the capacitor plates arranged as in FIG. 10.

In FIGS. 13 and 15 the lateral offset is zero indicating that the belt is tracking properly. The overlap area of the four front plates with the belt capacitor plate $P_6$ in FIG. 15 is the same for each as is the overlap area of the four rear plates in FIG. 13. As long as there is no roll (rotation about the x axis in FIG. 15) or yaw (rotation about the z axis into the page in FIG. 15), the corresponding left and right capacitances will be equal indicating that the lateral tracking offset is zero.

FIG. 16 shows the belt shifted laterally along the y axis to indicate a tracking offset. In that situation, the overlap of the external right front height and tracking plates $P_{4RF}$ and $P_{5RF}$ with the belt plate $P_6$ is greater than the overlap of the corresponding left plates $P_{4LF}$ and $P_{5LF}$ with the belt plate $P_6$. Because of the greater overlap of the right-side plates, the capacitances they form with the belt plate $P_6$ are greater than the capacitances formed with the left side plates. The differences between the right-side capacitances and the left-side capacitances or the ratios of the left-side capacitances to the right-side capacitances are proportional to the tracking offset. The rear plates would produce a similar difference in capacitances for the same tracking offset. The processor compares the computed lateral offset to a predetermined maximum allowable tracking-offset value. If the maximum allowable tracking-offset value is exceeded, the processor reports an error condition indicating that the conveyor requires maintenance, and the main force or weight measurement calculations can be disabled or tagged as possibly inaccurate.

An electrical schematic corresponding to the plate configuration of FIG. 15 is shown in FIG. 14. The oscillator energizes the stationary main drive plate $P_1$, which forms a capacitor with the belt capacitor plate $P_6$. The capacitor is formed by the overlap of the drive plate $P_1$ with a drive region of the belt plate $P_6$. The four stationary front right and left height and tracking plates $P_{4RF}$, $P_{4LF}$ and $P_{5RF}$, $P_{5LF}$ overlap other portions of the belt plate $P_6$ to form four other capacitors in four separate capacitive circuits. Outputs 182, 184, 186, 188 of the four capacitance-measuring circuits are routed to the signal conditioner, the ADC, and the processor in the detection section.

Figure 17A:
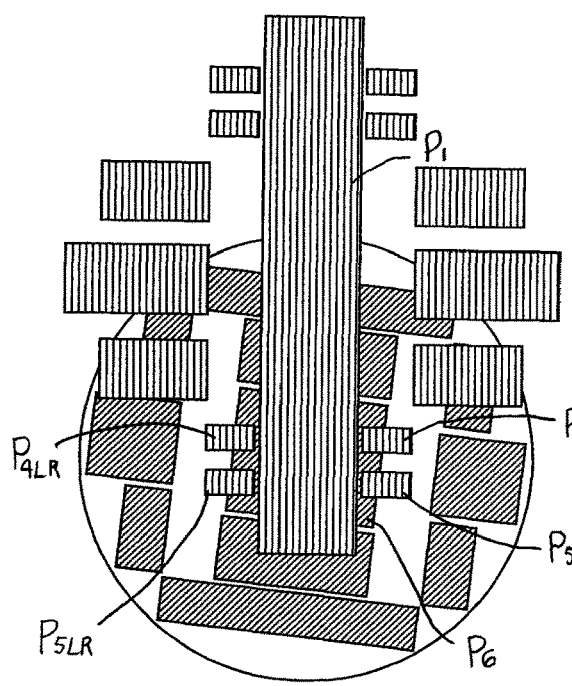
FIGS. 17A and 17B are top plan views as in FIG. 15 for measuring belt yaw with rear capacitive sensors and with front capacitive sensors.
Figure 17B:
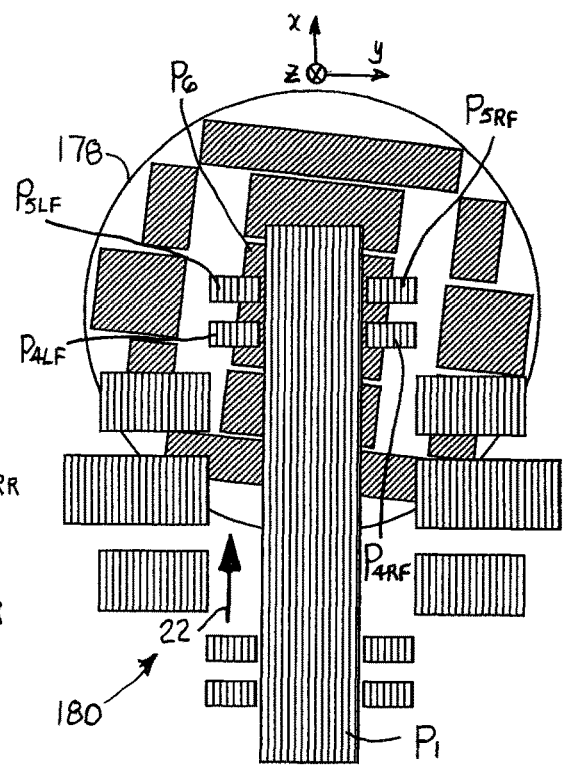
Figure 18:
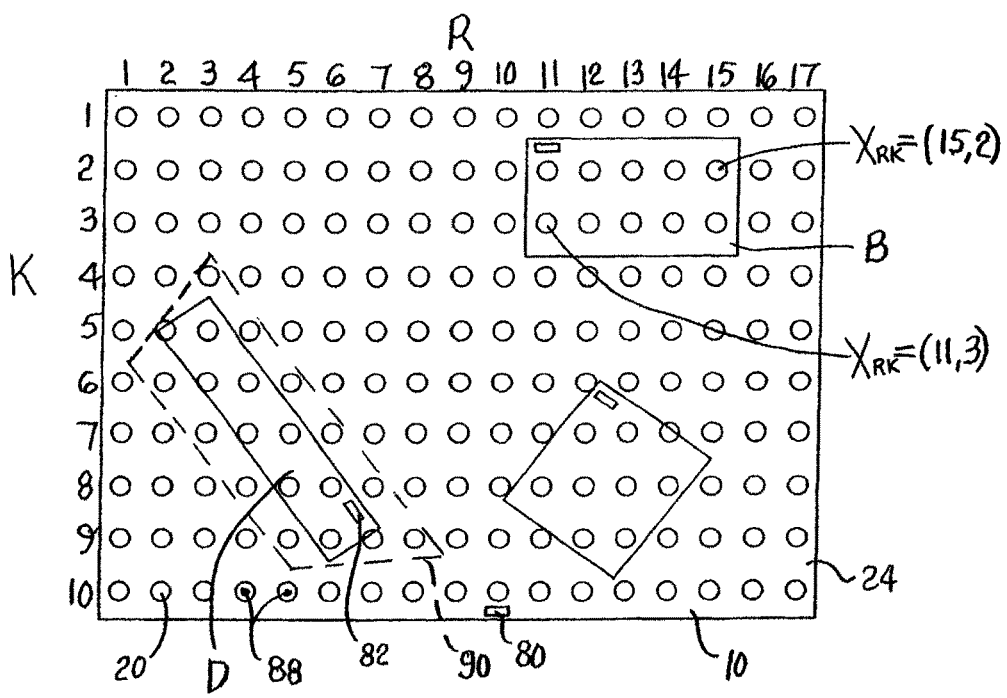
FIG. 18 is a top schematic of the conveyor system of FIG. 2.

FIGS. 17A and 17B show how the rear and the front height and tracking plates can be used to measure yaw (rotation of the belt module about the z axis). (In both FIGS. 17A and 17B, the lateral offset is zero.) The description of operation in reference to the front plates in FIG. 17B applies analogously to the operation of the rear plates in FIG. 17A. When the belt sensor 178 is rotated about the z axis relative to the stationary drive and detection system 180, the overlap of the right front tracking plate $P_{5RF}$ with the belt plate $P_6$ is greater than the overlap of the right front height plate $P_{4RF}$. Conversely, the overlap of the left front tracking plate $P_{5LF}$ with the belt plate $P_6$ is less than the overlap of the left front height plate $P_{4LF}$. The differences in the capacitances on each side are measures of the yaw of the belt module relative to the conveying direction 22. The processor compares the computed yaw to a predetermined maximum allowable yaw value. If the maximum allowable yaw value is exceeded, the processor reports an error condition indicating that the conveyor requires maintenance, and the main force or weight measurement calculations can be disabled or tagged as possibly inaccurate.

The operation of the detection section of the drive and detection stage is described with reference to one implementation of a firmware program executing from the program memory 174 of the processor 172 in FIG. 8. For simplicity of explanation the description is limited in detail to the measurements made with respect to the circuits shown in FIG. 11. In FIG. 11, the detection section reads: a) the output signal 160 of the main measurement capacitor $C_M$; b) the output signal 162 of the reference capacitor $C_R$; c) the output signals 164', 164" of the front-height capacitor circuits; and d) the output signals 166', 166" of the rear-height capacitor circuits.

The processor 172 runs a real time executive in its program memory 174 that includes a task manager scheduling the running of various tasks, e.g., identifying blocks of valid measurement data and calculating weight, displaying data and alarms, handling operator inputs. The output signals 160, 162, 164', 164", 166', 166" are sampled at the outputs of the ADC 170 by a sampling interrupt service routine that runs at a predetermined periodic sample rate. The interrupt service routine stores each of the sampled digital output signals in a respective buffer in the data memory 176. Thus, each buffer contains a time series of the previous N output samples, where N is the length of the buffers. Before completing execution, the interrupt service routine increments a buffer pointer to the next buffer location and sets a semaphore to bid a calculation task to run.

The calculation task runs as bid by the sampling interrupt service routine and scheduled by the task manager. The calculation task executes a pattern-recognition routine on at least one of the buffers, e.g., the measurement capacitor $C_M$ buffer, to select a block of consecutive sampled output values that represent valid data taken when the sensor's plates overlapped the external plates as in FIG. 10. Because all the output signals 160, 162, 164', 164", 166', 166" are valid at the same time, the corresponding block of sampled output values from the buffers are used in the ultimate weight calculation. The calculation task could, for example, average all the values, select the maximum value, or find the statistical mean of each data block to produce a measurement value. The measurement values are then scaled as necessary. The front belt-height values are combined to calculate a front belt-module height, and the rear belt-height values are combined to calculate a rear belt-module height. The front and rear heights can be used to calculate module pitch, or tilt about a lateral axis. The height values are then used to correct the main measurement capacitor value and the reference capacitor value. Finally, the reference capacitor value is subtracted from the measurement capacitor value to produce the final measurement value, which another task may send to a display. If compensation by the reference capacitor is applied at the analog level in hardware, the processor instead has only to convert the digitized compensated measurement value into the proper units for the display.

In an expanded system including tracking, roll, and yaw measurements, the sampling interrupt service routine would also sample the output signals 186, 188 of the right and left tracking circuits (FIG. 14) and store them in respective buffers. The calculation task would then identify in each of the tracking circuit buffers two blocks of data that represent when the belt plates are aligned with the stationary external plates as in FIG. 13 (rear) and as in FIG. 15 (front). The calculation task then identifies the corresponding two blocks of data in each of the right and left height buffers. From those eight blocks of data, the calculation task can calculate the lateral tracking offset, the roll, and the yaw of the belt module. If any of those calculated values exceeds its predetermined maximum acceptable value, the calculation task sets an alarm flag and marks the main measurements as questionable. Another task can then display the alarm as a notification that maintenance on the conveyor is required.

A vision system as in FIG. 1 includes the camera 76 or other optical detector supported above the carryway 32 to vision a portion of the conveying surface 24. Optical signals 107 from the camera are sent to the video processor 108. The processor executes a pattern-recognition routine to determine the footprints of individual articles conveyed on the belt from the optical signals. With a priori knowledge of the force-sensor-array geometry relative to a point on the belt, such as a belt-module corner 78, the vision system can determine relatively a group of force sensors under an individual article's footprint. For example, in the portion of the top conveying side 24 as shown in FIG. 8, article B overlies ten force sensors covering two columns K and five rows R. Optically detectable markers 80 on some or all belt rows, for example, may be used by the vision system to identify absolutely which ten sensors are covered by article B. In this example, the vision system reads the marker, which may be coded or may simply be the number 10 indicating that it is on row 10 of the belt. With the a priori knowledge of the array geometry and the footprint of article B with respect to row 10, the vision system can identify the ten sensors underlying the article. The vision system can then execute a weighing process that combines the measurements of the three sensors at absolute positions $X_{RK}=\{(R, K)\}=\{(11, 2); (11, 3); (12, 2); (12, 3); (13, 2); (13, 3); (14, 2); (14, 3); (15, 2); (15, 3)\}$ to compute the weight of article B. The force-sensor measurements may be combined, for example, by summing the individual measurements to compute a value equal or proportional to the weight of the underlying article. Each of the articles is marked with identifying indicia 82, such as a bar code, that a reader in the vision system can interpret. In that way the computed weight can be associated with a specific individual article. And, because the vision system visions the entire width of the belt, articles do not have to be arranged in a single file over a static weighing station in the carryway. Furthermore, the capacitive antenna array in the belt allows the weight to be measured without stopping the belt. A video display of the vision system may be used to monitor system operating conditions and settings or the weights of individual articles. The video processor 108 may be a stand-alone programmable logic controller, a laptop, a desktop, or any appropriate computer device capable of executing the processes described; or it may be realized by routines executed by the main processor 172 (FIG. 8).

The vision system could use other means to assign weights to individual articles. For example, the positions of each of the force sensors could be marked on the top conveying side 24 or the force-sensor pressure platforms 26. The mark could identify each force sensor explicitly or could just be a generic position mark, such as a dot 88 (FIG. 1) on each or a predetermined subset of the sensing circuits. If all the sensing-element positions are marked, the vision system would not need a priori knowledge of the array layout. As another example, the vision system could alternatively select all those sensors in an enlarged region 90 (FIG. 8) about the article footprint and sum their measurements. The force sensors not under the article D would yield measurement values of zero, which would not add to the weight. This ensures that the entire article is weighed accurately. If, of course, another article is close by, the enlarged region has to be carefully selected so as not to encompass the nearby article. If the articles are separated enough that no two articles are atop the same or adjacent force sensors, the weight of each article can be determined by summing the load-cell measurements of contiguous, non-zero-reading load cells.

The force sensors can also be used to determine the center of gravity (COG) of a conveyed article from the force measurements of each of the contiguous, non-zero-reading load cells and a priori knowledge of each sensor's relative position via conventional COG formulas. And, more simply, the force sensors can be used as position sensors to determine the positions of articles on the belt for improved tracking of diverted articles or to detect article skew on the belt from the pattern of contiguous non-zero-reading load cells under a conveyed article.

Figure 19:
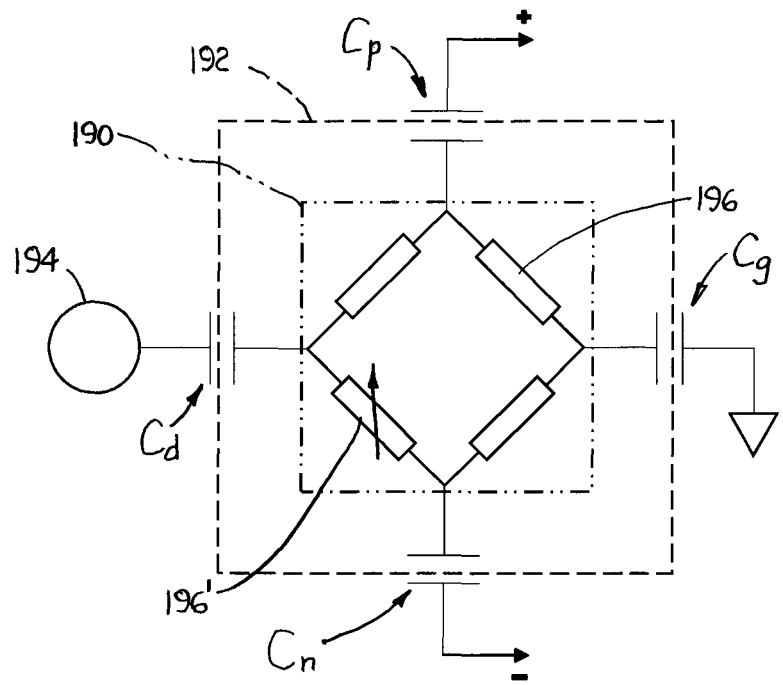
FIG. 19 is an electrical schematic of a bridge-type sensor in the conveyor belt.

In the examples described in detail, a capacitive sensor whose capacitance changes with an applied force or weight was used as an example. But other sensors that measure other physical properties, such as temperature, pressure, or humidity, can be used. In FIG. 19 a four-terminal bridge-type sensor 190 in the conveyor belt 192 is capacitively coupled by a drive capacitor $C_d$ to an external oscillator 194. One plate of the capacitor $C_d$ resides in the bottom of the belt 192; the other plate resides in the conveyor carryway external to the belt. Another capacitor $C_g$ couples the opposite corner of the bridge sensor 190 to an external ground. Positive and negative outputs of the bridge sensor 190 are capacitively coupled to an external detector including a signal conditioner, ADC, and processor as in FIG. 8 over communication capacitors $C_p$ and $C_n$. For this bridge sensor, the signal conditioner includes a differential amplifier for the differential sensor output signal across the positive (+) and negative (−) terminals. Each coupling capacitor $C_d$, $C_g$, $C_p$, $C_n$ has one plate at the bottom of the belt and the other plate in the carryway frame external to the belt. When all the corresponding belt and external plates are aligned, the output is valid. Each leg of the bridge sensor may have elements 196 that are resistive, inductive, or capacitive, or some combination. One of the elements is a sensing element 196' whose impedance changes with the physical property being sensed.

Figure 20:
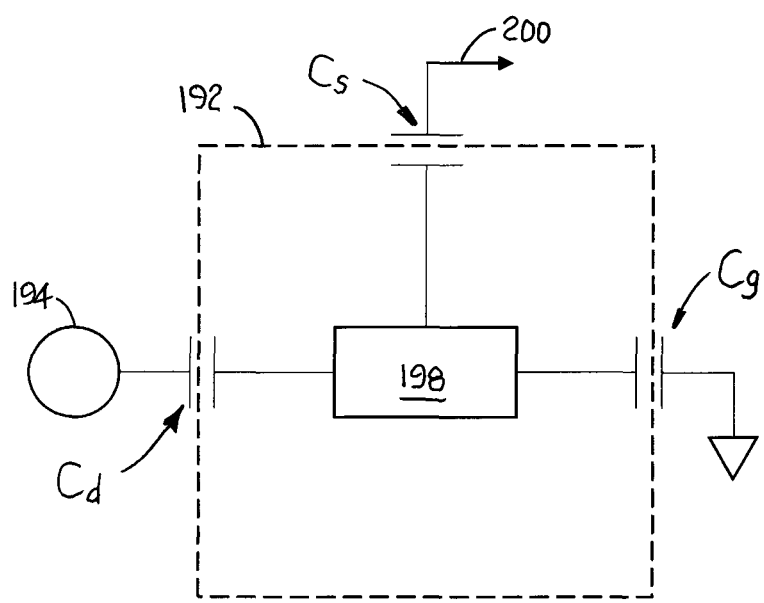
FIG. 20 is an electrical schematic of a three-terminal sensor in the conveyor belt.

FIG. 20 shows an example of a three-terminal sensor 198 in the conveyor belt 192. Like the other sensors, it is driven by the external oscillator 194 through a drive capacitor $C_d$, one of whose plates is in the belt 192 and the other of which is external to the belt. The sensor is coupled to an external ground through another capacitor $C_g$. The sensor output signal 200 is sent to a detector including a signal conditioner, ADC, and processor as in FIG. 8 via a communication capacitor $C_s$. As for the sensor of FIG. 19, the output sensor signal 200 of the three-terminal sensor 198 is valid when the corresponding belt and external plates of the capacitors $C_d$, $C_g$, $C_s$ overlap each other. The plates of the capacitors in the examples of FIGS. 19 and 20 use geometrical arrangements as in FIG. 9 appropriately modified for the three- and four-terminal sensors 190, 198. Belt-height, tracking, and reference capacitors may also be used with these sensors.

Although the conveyor-belt measuring system has been described in detail with reference to a few versions, other versions are possible. For example, the conveyor belt need not be a modular plastic conveyor belt. It could be a flat belt or a slat conveyor, for instance. As another example, visioning algorithms and detectable markers on the belt other than those described could be used by the vision system to identify individual articles and the sensors lying under them. And each sensor stage could include multiple sensors to measure different physical properties.

What is claimed is:

1. A conveyor-belt measuring system comprising:
    a conveyor belt having a top side and a bottom side;
    a drive and detection stage external to the conveyor belt and including:
        an oscillator producing a drive signal;
        a first external capacitor plate positioned near the bottom side of the conveyor belt and connected in series with the oscillator;
        a second external capacitor plate positioned near the bottom side of the conveyor belt;
        a detector connected to the second external capacitor plate;
    a first belt capacitor plate mounted in the conveyor belt near the bottom side of the conveyor belt;
    a second belt capacitor plate mounted in the conveyor belt near the bottom side of the conveyor belt;
    wherein the first belt capacitor plate and the first external capacitor plate are aligned to form a drive capacitor when the second belt capacitor plate and the second external capacitor plate are aligned to form a communication capacitor;
    a sensor mounted in the conveyor belt and connected in series between the drive capacitor and the communication capacitor;
    wherein the drive capacitor couples the drive signal to the sensor to produce a sensor signal indicative of a physical property measured by the sensor; and
    wherein the detector receives the sensor signal from the communication capacitor.

2. A conveyor-belt measuring system as in claim 1 wherein the sensor is a capacitor whose capacitance changes with the physical property.

3. A conveyor-belt measuring system as in claim 1 wherein the drive and detection stage further includes:
    a first external reference capacitor plate positioned near the bottom side of the conveyor belt and connected in series with the oscillator;
    a second external reference capacitor plate positioned near the bottom side of the conveyor belt;
    a reference detector connected to the second external capacitor plate; and
    wherein the conveyor-belt measuring system further comprises:
        a first belt reference capacitor plate mounted in the conveyor belt near the bottom side of the conveyor belt;
        a second belt reference capacitor plate mounted in the conveyor belt near the bottom side of the conveyor belt;
        wherein the first belt reference capacitor plate and the first external reference capacitor plate are aligned to form a reference drive capacitor and the second belt reference capacitor plate and the second external reference capacitor plate are aligned to form a reference communication capacitor when the first and second belt capacitor plates are aligned with the first and second external capacitor plates;
        a reference capacitor having a fixed capacitance mounted in the conveyor belt and connected in series between the reference drive capacitor and the reference communication capacitor;
    wherein the reference drive capacitor couples the drive signal to the reference capacitor to produce a reference signal insensitive to the physical property measured by the sensor, but sensitive to ambient conditions affecting the sensor;
    wherein the reference detector receives the reference signal from the reference communication capacitor.

4. A conveyor-belt measuring system as in claim 3 wherein the first external capacitor plate and the first external reference capacitor plate are the same capacitor plate.

5. A conveyor-belt measuring system as in claim 3 wherein the overlapping plate areas of the drive capacitor and the reference drive capacitor are equal and the overlapping plate areas of the communication capacitor and the reference communication capacitor are equal.

6. A conveyor-belt measuring system as in claim 1 wherein the drive and detection stage further includes:
    a front external height capacitor plate positioned near the bottom side of the conveyor belt;
    a rear external height capacitor plate positioned near the bottom side of the conveyor belt and spaced apart from the front external height capacitor plate in a conveying direction; and
    wherein the conveyor-belt measuring system further comprises:
        a front belt height capacitor plate mounted in the conveyor belt near the bottom side of the conveyor belt;
        a rear belt height capacitor plate mounted in the conveyor belt near the bottom side of the conveyor belt and spaced apart from the front belt height capacitor plate in the conveying direction;
    wherein the first external capacitor plate overlaps first portions of the front and rear belt height capacitor plates to form front and rear height drive capacitors and a second portion of the front belt height capacitor plate overlaps the front external height capacitor plate to form a front height capacitor when a second portion of the rear belt height capacitor plate overlaps the rear external height capacitor plate to form a rear height capacitor;
    wherein the front height drive capacitor is in series with the front height capacitor with a front series capacitance and the rear height drive capacitor is in series with the rear height capacitor with a rear series capacitance;
    wherein the first external capacitor plate couples the drive signal to the front and rear height capacitors to produce front and rear height signals indicative of the front and rear series capacitances;
    wherein deviation of the ratio of the front series capacitance to the rear series capacitance from unity is a measure of the pitch of the belt.

7. A conveyor-belt measuring system as in claim 6 wherein:
    the front external height capacitor plate comprises a right front external height capacitor plate and a left front external height capacitor plate spaced apart from the right front external height capacitor plate in a direction perpendicular to the conveying direction;
    the rear external height capacitor plate comprises a right rear external height capacitor plate and a left rear external height capacitor plate spaced apart from the right rear external height capacitor plate in a direction perpendicular to the conveying direction;

the front height capacitor forms a right front height capacitor in series with the front height drive capacitor with a right front series capacitance and a left front height capacitor in series with the front height drive capacitor with a left front series capacitance;

the rear height capacitor forms a right rear height capacitor in series with the rear height drive capacitor with a right rear series capacitance and a left rear height capacitor in series with the rear height drive capacitor with a left rear series capacitance;

wherein the first external capacitor plate couples the drive signal to the right front, left front, right rear, and left rear height capacitors to produce right front, left front, right rear, and left rear height signals indicative of right front, left front, right rear, and left rear series capacitances;

wherein a deviation of the ratio of the right front series capacitance to the left front series capacitance from unity and a deviation of the ratio of the right rear series capacitance to the left rear series capacitance from unity are measures of the roll of the belt.

8. A conveyor-belt measuring system as in claim 1 wherein the drive and measurement circuit further includes:
a right external tracking capacitor plate positioned near the bottom side of the conveyor belt;
a left external tracking capacitor plate positioned near the bottom side of the conveyor belt and spaced apart from the right external tracking capacitor plate in a direction perpendicular to a conveying direction; and
wherein the conveyor-belt measuring system further comprises a belt tracking capacitor plate mounted in the conveyor belt near the bottom side of the conveyor belt;
wherein the first external capacitor plate overlaps a first portion of the belt tracking capacitor plate to form a tracking drive capacitor and a second portion of the belt tracking capacitor plate overlaps the right external tracking capacitor plate to form a right tracking capacitor when a third portion of the belt tracking capacitor plate overlaps the left external tracking capacitor plate to form a left tracking capacitor;
wherein the tracking drive capacitor is in series with the right tracking capacitor with a right series capacitance and the tracking drive capacitor is in series with the left tracking capacitor with a left series capacitance;
wherein the first external capacitor plate couples the drive signal to the right and left tracking capacitors to produce right and left tracking signals indicative of the right and left series capacitances;
wherein the difference between the left and right series capacitances is a measure of the wander of the conveyor belt in the direction perpendicular to the conveying direction.

9. A conveyor-belt measuring system as in claim 1 wherein the sensor is a force sensor that includes a pressure platform at the top side of the conveyor belt and a pin between the pressure platform and the sensor transmitting the weight of an article atop the pressure platform to the sensor so that the sensor signal indicates the weight of the article atop the pressure platform.

10. A conveyor-belt measuring system comprising:
a conveyor belt supported in a carryway and having a top side and a bottom side and having a sensor stage including:
first and second belt plates disposed near the bottom side of the conveyor belt;
a first sensor connected in series with the first and second belt plates and providing a first sensor signal responsive to a physical property;
a drive and detection stage external to the conveyor belt and including:
an oscillator;
a first external plate along the carryway connected in series with the oscillator;
a first detector;
a second external plate along the carryway connected in series with the first detector;
wherein the first external plate overlaps the first belt plate to form a first capacitor when the second external plate overlaps the second belt plate to form a second capacitor and a measurement circuit including the oscillator, the first capacitor, the first sensor, the second capacitor, and the first detector;
wherein the first external plate and the first belt plate have different lateral and longitudinal dimensions and the second external plate and the second belt plate have different lateral and longitudinal dimensions.

11. A conveyor-belt measuring system as in claim 10 wherein:
the sensor stage further includes:
third and fourth belt plates disposed near the bottom side of the conveyor belt;
a second sensor connected in series with the third and fourth belt plates;
the drive and detection stage further includes:
a third external plate connected in series with the oscillator;
a second detector;
a fourth external plate connected in series with the second detector;
wherein the third external plate overlaps the third belt plate to form a third capacitor and the fourth external plate overlaps the fourth belt plate to form a fourth capacitor when the second external plate overlaps the second belt plate forming a second measurement circuit including the oscillator, the third capacitor, the second sensor, the fourth capacitor, and the second detector.

12. A conveyor-belt measuring system as in claim 11 wherein the third external plate and the third belt plate have different lateral and longitudinal dimensions and the fourth external plate and the fourth belt plate have different lateral and longitudinal dimensions.

13. A conveyor-belt measuring system as in claim 11 wherein the third external plate comprises two third external subplates, the third belt plate comprises two third belt subplates, the fourth external plate comprises two fourth external subplates, and the fourth belt plate comprises two fourth belt subplates.

14. A conveyor-belt measuring system as in claim 11 wherein the area of overlap of the first external plate and the first belt plate equals the area of overlap of the third external plate and the third belt plate.

15. A conveyor-belt measuring system as in claim 11 wherein:
the second sensor produces a second signal responsive to ambient conditions affecting the first sensor and unresponsive to the physical property measured by the first sensor;
the first detector receives the first sensor signal from the first sensor;
the second detector receives the second sensor signal from the second sensor; and the second signal is combined with the first signal to compensate for the effect of ambient conditions on the first signal.

16. A conveyor-belt measuring system as in claim 10 wherein:
the sensor stage further includes third and fourth belt plates disposed near the bottom side of the conveyor belt spaced apart in a conveying direction on opposite sides of the first belt plate;
the drive and detection stage further includes:
third and fourth external plates disposed near the bottom side of the conveyor belt spaced apart in the conveying direction on opposite sides of the first external plate;
a third detector in series with the third external plate and a fourth detector in series with the fourth external plate;
wherein the third external plate overlaps the third belt plate to form a third capacitor and the fourth external plate overlaps the fourth belt plate to form a fourth capacitor when the second external plate overlaps the second belt plate;
wherein the capacitance of the third capacitor measured by the third detector and the capacitance of the fourth capacitor measured by the fourth detector are proportional to the height of the belt above the third and fourth external plates at the third and fourth belt plates.

17. A conveyor system as in claim 16 wherein the heights measured by the third detector and the fourth detector are used to correct the effect of belt height on the first sensor signal.

18. A conveyor-belt measuring system as in claim 16 wherein:
the third external plate includes two third external subplates on opposite sides of the longitudinal centerline of the sensor stage;
the fourth external plate includes two fourth external subplates on opposite sides of the longitudinal centerline of the sensor stage.

19. A conveyor-belt measuring system as in claim 18 wherein the lateral dimension of the third and fourth belt plates is greater than the distance between the laterally outer sides of the two third and fourth external subplates so that the area of the plate overlap between the third external plate and the third belt plate and the area between the fourth external plate and the fourth belt plate are constant over a range of lateral tracking offsets.

20. A conveyor-belt measuring system as in claim 10 wherein:
the drive and detection stage further includes:
third left and right external plates disposed near the bottom side of the conveyor belt spaced apart in the conveying direction on opposite sides of the first external plate;
fourth left and right external plates disposed near the bottom side of the conveyor belt spaced apart from and aligned with the third left and right external plates in the conveying direction on opposite sides of the first external plate;
third left, third right, fourth left, and fourth right detectors each connected in series with the respective third left, third right, fourth left, and fourth right external plates;
wherein the third left, third right, fourth left, and fourth right external plates overlap the first belt plate to form third left, third right, fourth left, and fourth right capacitors;
wherein the third left, third right, fourth left, and fourth right detectors measure the capacitances of the third left, third right, fourth left, and fourth right capacitors, the capacitances being used to determine a lateral tracking offset or yaw of the conveyor belt.

21. A conveyor-belt measuring system as in claim 10 wherein the first sensor is a capacitor whose capacitance changes with the physical property.

22. A conveyor-belt measuring system as in claim 10 comprising a plurality of drive and measurements stages in longitudinally extending lanes across the carryway and wherein the conveyor belt comprises a plurality of sensor stages arranged in rows and columns along the conveyor belt.

23. A conveyor-belt measuring system comprising:
a conveyor belt supported in a carryway and having a sensor stage including:
a first sensor providing a first sensor signal responsive to a physical property and ambient conditions;
a second sensor providing a second signal responsive to the ambient conditions affecting the first sensor and unresponsive to the physical property measured by the first sensor;
a drive and detection stage external to the conveyor belt and including:
an oscillator;
a first detector and a second detector;
wherein the oscillator drives the first and second sensors respectively through first and second drive capacitors each having an external plate connected to the oscillator in the drive and detection stage along the carryway and a belt plate in the conveyor belt connected to the first or second sensor;
wherein the first and second sensor signals are sent respectively to the first and second detectors through first and second communication capacitors each having:
an external plate connected to the first detector or the second detector in the drive and detection stage along the carryway, and
a belt plate in the conveyor belt connected to the first sensor or to the second sensor;
wherein the second signal is combinable with the first signal to compensate for the effect of ambient conditions on the first signal.

24. A conveyor-belt measuring system as in claim 23 wherein the first sensor is a capacitor whose capacitance varies with the physical property and the second sensor is a capacitor whose capacitance does not vary with the physical property.

25. A conveyor-belt measuring system as in claim 23 wherein the first and second drive capacitors use the same external plate.

26. A conveyor-belt measuring system as in claim 23 further comprising:
a height detector external to the conveyor belt;
a height drive capacitor having an external plate connected to the oscillator and a height drive plate in the conveyor belt;
a height communication capacitor having an external plate connected to the height detector and a height communication plate in the conveyor belt connected in series with the height drive plate;
wherein the series capacitance of the height drive capacitor and the height communication capacitor is inversely proportional to the height of the conveyor belt above the carryway.

27. A conveyor-belt measuring system as in claim 26 wherein the external plate of the height drive capacitor and the external plate of the height communication capacitor are different portions of the same capacitor plate.

28. A conveyor-belt measuring system as in claim 26 comprising a plurality of height drive capacitors and height communication capacitors positioned at height-sensing locations in the conveyor belt and a plurality of height detectors external to the conveyor belt to measure the heights of the conveyor belt at the height-sensing locations.

29. A conveyor-belt weighing system comprising:
a conveyor belt having a top side and a bottom side;
a sensing capacitor mounted in the conveyor belt and having a capacitance that varies with the weight of an article on the top side of the conveyor belt above the sensing capacitor;
a drive capacitor and a communication capacitor in series with the sensing capacitor, wherein the drive capacitor and the communication capacitor each have a first plate in the conveyor belt near the bottom side and a second plate external to the conveyor belt near the bottom side so that the first and second plates of the drive capacitor overlap when the first and second plates of the communication capacitor overlap;
an oscillator external to the conveyor belt energizing the sensing capacitor through the drive capacitor to produce a weight signal that varies with the capacitance of the sensing capacitor;
a weight detector external to the conveyor belt and connected to the communication capacitor to receive the weight signal.

30. A conveyor-belt weighing system as in claim 29 further comprising:
a pressure platform biased outward of the top side of the conveyor belt for supporting conveyed articles;
a pin extending from the pressure platform toward the bottom side of the conveyor belt to transmit the weight of the article on the pressure platform to the sensing capacitor to change the capacitance as a function of the weight applied.

31. A conveyor-belt weighing system as in claim 29 further comprising:
a reference capacitor mounted in the conveyor belt near the sensing capacitor and having a capacitance that does not vary with the weight of an article on the top side of the conveyor belt, but that does vary with ambient conditions in the same way as the sensing capacitor;
a reference drive capacitor and a reference communication capacitor connected in series with the reference capacitor;
wherein the reference drive capacitor and the reference communication capacitor each have a first plate in the conveyor belt near the bottom side and a second plate external to the conveyor belt near the bottom side so that the first and second plates of the reference drive capacitor and of the reference communication capacitor overlap when the first and second plates of the drive capacitor and of the communication capacitor overlap;
wherein the oscillator energizes the reference capacitor through the reference drive capacitor to produce a reference signal that varies with the capacitance of the reference capacitor to compensate for variations in the weight signal due to the ambient conditions affecting the sensing capacitor;
a reference detector external to the conveyor belt and connected to the reference communication capacitor to receive the reference signal.

32. A conveyor-belt weighing system as in claim 31 comprising compensation means receiving the weight signal and the reference signal and calculating a compensated weight value from the weight signal and the reference signal.

33. A conveyor-belt weighing system as in claim 29 further comprising:
a height sensor for measuring the height of the conveyor belt wherein the height sensor includes:
a front capacitor having a front external plate external to the conveyor belt and a front belt plate mounted in the conveyor belt near the bottom side, the front capacitor having a front capacitance that varies with the separation between the front external plate and the front belt plate;
a rear capacitor having a rear external plate external to the conveyor belt and a rear belt plate mounted in the conveyor belt near the bottom side and spaced apart in the conveying direction from the front belt plate, the rear capacitor having a rear capacitance that varies with the separation between the rear external plate and the rear belt plate;
a front drive capacitor formed by an external plate and the front belt plate and connected in series with the front capacitor;
wherein the oscillator energizes the front capacitor through the front drive capacitor to produce a front belt-height signal;
a rear drive capacitor formed by an external plate and the rear belt plate and connected in series with the rear capacitor;
wherein the oscillator energizes the rear capacitor through the rear drive capacitor to produce a rear belt-height signal;
a height detector detecting the front and rear belt-height signals; and
a processor receiving the front and rear belt-height signals and calculating a belt height value from the front and rear belt-height signals.

* * * * *